(12) United States Patent
Grams

(10) Patent No.: US 11,715,317 B1
(45) Date of Patent: Aug. 1, 2023

(54) AUTOMATIC GENERATION OF TRAINING DATA FOR HAND-PRINTED TEXT RECOGNITION

(71) Applicant: Konica Minolta Business Solutions U.S.A., Inc., San Mateo, CA (US)

(72) Inventor: Jason James Grams, Westminster, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 9 days.

(21) Appl. No.: 17/562,344

(22) Filed: Dec. 27, 2021

(51) Int. Cl.
*G06V 30/414* (2022.01)
*G06V 30/19* (2022.01)
*G06V 30/16* (2022.01)
*G06V 30/244* (2022.01)

(52) U.S. Cl.
CPC ........ *G06V 30/414* (2022.01); *G06V 30/1613* (2022.01); *G06V 30/19147* (2022.01); *G06V 30/2455* (2022.01)

(58) Field of Classification Search
CPC ............. G06V 30/414; G06V 30/1613; G06V 30/19147; G06V 30/2455
See application file for complete search history.

(56) References Cited

U.S. PATENT DOCUMENTS

| | | | |
|---|---|---|---|
| 5,361,311 A | 11/1994 | Wilson | |
| 5,504,822 A | 4/1996 | Holt | |
| 5,555,317 A | 9/1996 | Anderson | |
| 5,559,897 A | 9/1996 | Brown et al. | |
| 6,954,898 B1 * | 10/2005 | Nakai | G06F 40/109 |
| | | | 715/269 |
| 10,402,699 B1 | 9/2019 | Chen et al. | |
| 10,607,115 B1 | 3/2020 | Pintsov | |
| 2003/0152277 A1 | 8/2003 | Hall et al. | |
| 2003/0169925 A1 | 9/2003 | Polonowski | |
| 2005/0262339 A1 | 11/2005 | Fischer | |
| 2006/0153616 A1 | 7/2006 | Hofmann | |
| 2006/0222239 A1 | 10/2006 | Bargeron et al. | |
| 2007/0011117 A1 | 1/2007 | Abdulkader et al. | |
| 2007/0094169 A1 | 4/2007 | Yamada et al. | |

(Continued)

*Primary Examiner* — Ping Y Hsieh
*Assistant Examiner* — Daniella M. DiGuglielmo
(74) *Attorney, Agent, or Firm* — Osha Bergman Watanabe & Burton LLP

(57) ABSTRACT

A method for generating training data for hand-printed text recognition includes obtaining a structured document, obtaining a set of hand-printed character images and database metadata from a database, generating a modified document page image, and outputting a training file. The structured document includes a document page image that includes text characters and document metadata that associates each of the text characters to a document character label. The database metadata associates each of the set of hand-printed character images to a database character label. The modified document page image is generated by iteratively processing each of the text characters. The iterative processing includes determining whether an individual text character should be replaced, selecting a replacement hand-printed character image from the set of hand-printed character images, scaling the replacement hand-printed character image, and inserting the replacement hand-printed character image into the modified document page image.

20 Claims, 4 Drawing Sheets

(56) References Cited

U.S. PATENT DOCUMENTS

| | | |
|---|---|---|
| 2007/0192687 A1 | 8/2007 | Simard et al. |
| 2012/0106855 A1 | 5/2012 | Gotoh et al. |
| 2014/0278353 A1 | 9/2014 | Herdagdelen et al. |
| 2016/0379048 A1* | 12/2016 | Kumar ................. G06V 30/333 382/189 |
| 2018/0137349 A1 | 5/2018 | Such et al. |
| 2019/0340429 A1 | 11/2019 | Berseth et al. |
| 2019/0362187 A1 | 11/2019 | Otaki et al. |
| 2020/0202173 A1* | 6/2020 | Oishi ..................... G06V 10/82 |
| 2020/0320289 A1* | 10/2020 | Su .................... G06V 30/19147 |
| 2020/0342354 A1* | 10/2020 | Inagaki ................. G06N 20/00 |

* cited by examiner

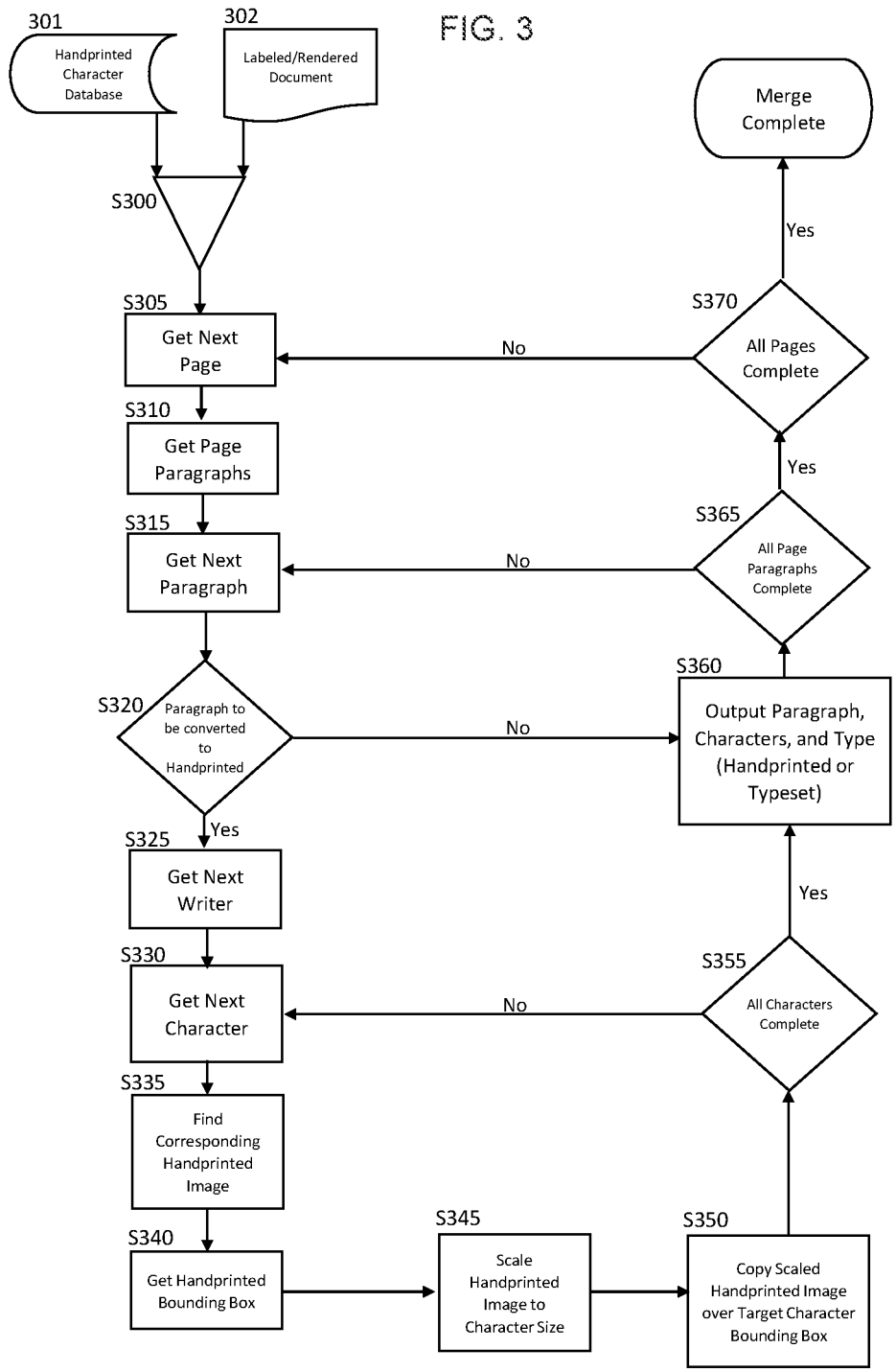

AUTOMATIC GENERATION OF TRAINING DATA FOR HAND-PRINTED TEXT RECOGNITION

BACKGROUND

Automated processing of documents is becoming an important part of the technological landscape across a wide range of government, educational, and industrial institutions. In many circumstances, it is necessary to process documents that are either handwritten or contain a mixture of handwriting and typed text. In order to automate the processing of such documents, it is critical to have hand-printed training data to train the underlying machine learning algorithms. While databases of labeled, hand-printed characters exist, these are not suitable to train algorithms for processing whole documents because they lack the structural and contextual relationships between the characters that are present in documents. Furthermore, creation of training documents, by human-based labeling of hand-printed documents, is both slow and error-prone.

SUMMARY

In general, one or more embodiments of the invention relate to a method for generating training data for hand-printed text recognition. The method comprises: obtaining a structured document comprising: a document page image that includes text characters, and document metadata that associates each of the text characters to a document character label; obtaining, from a database, a set of hand-printed character images and database metadata, wherein the database metadata associates each of the set of hand-printed character images to a database character label; generating a modified document page image by iteratively processing each of the text characters, wherein the iterative processing comprises: determining, based on a predefined condition, whether an individual text character should be replaced; selecting a replacement hand-printed character image from the set of hand-printed character images, wherein the selecting is based on matching the document character label of the individual text character to the database character label of the replacement hand-printed character image; scaling the replacement hand-printed character image to match a size of the individual text character in the document page image; and inserting the replacement hand-printed character image into the modified document page image, at a location based on a position of the individual text character, wherein the selecting, scaling, and inserting are each performed in response to determining that the individual text character should be replaced; and outputting a training file comprising: the modified document page image, and modified document metadata that associates each of a set of inserted hand-printed character images to an inserted character label.

In general, one or more embodiments of the invention relate to a non-transitory computer readable medium (CRM) storing computer readable program code for generating training data for hand-printed text recognition. The computer readable program code causes a computer to: obtain a structured document comprising: a document page image that includes text characters, and document metadata that associates each of the text characters to a document character label; obtain, from a database, a set of hand-printed character images and database metadata, wherein the database metadata associates each of the set of hand-printed character images to a database character label; generate a modified document page image by iteratively processing each of the text characters, wherein the iterative processing comprises: determining, based on a predefined condition, whether an individual text character should be replaced; selecting a replacement hand-printed character image from the set of hand-printed character images, wherein the selecting is based on matching the document character label of the individual text character to the database character label of the replacement hand-printed character image; scaling the replacement hand-printed character image to match a size of the individual text character in the document page image; and inserting the replacement hand-printed character image into the modified document page image, at a location based on a position of the individual text character, wherein the selecting, scaling, and inserting are each performed in response to determining that the individual text character should be replaced; and output a training file comprising: the modified document page image, and modified document metadata that associates each of a set of inserted hand-printed character images to an inserted character label.

In general, one or more embodiments of the invention relate to a system for generating training data for hand-printed text recognition. The system comprises: a memory; a processor coupled to the memory, wherein the processor: obtains a structured document comprising: a document page image that includes text characters, and document metadata that associates each of the text characters to a document character label; obtains, from a database, a set of hand-printed character images and database metadata, wherein the database metadata associates each of the set of hand-printed character images to a database character label; generates a modified document page image by iteratively processing each of the text characters, wherein the iterative processing comprises: determining, based on a predefined condition, whether an individual text character should be replaced; selecting a replacement hand-printed character image from the set of hand-printed character images, wherein the selecting is based on matching the document character label of the individual text character to the database character label of the replacement hand-printed character image; scaling the replacement hand-printed character image to match a size of the individual text character in the document page image; and inserting the replacement hand-printed character image into the modified document page image, at a location based on a position of the individual text character, wherein the selecting, scaling, and inserting are each performed in response to determining that the individual text character should be replaced; and outputs a training file comprising: the modified document page image, and modified document metadata that associates each of a set of inserted hand-printed character images to an inserted character label.

Other aspects of the invention will be apparent from the following description and the appended claims.

BRIEF DESCRIPTION OF DRAWINGS

FIG. 3 shows a flowchart of an implementation of a method for generating training data for hand-printed text recognition, in accordance with one or more embodiments of the invention.

DETAILED DESCRIPTION

Figure 1:
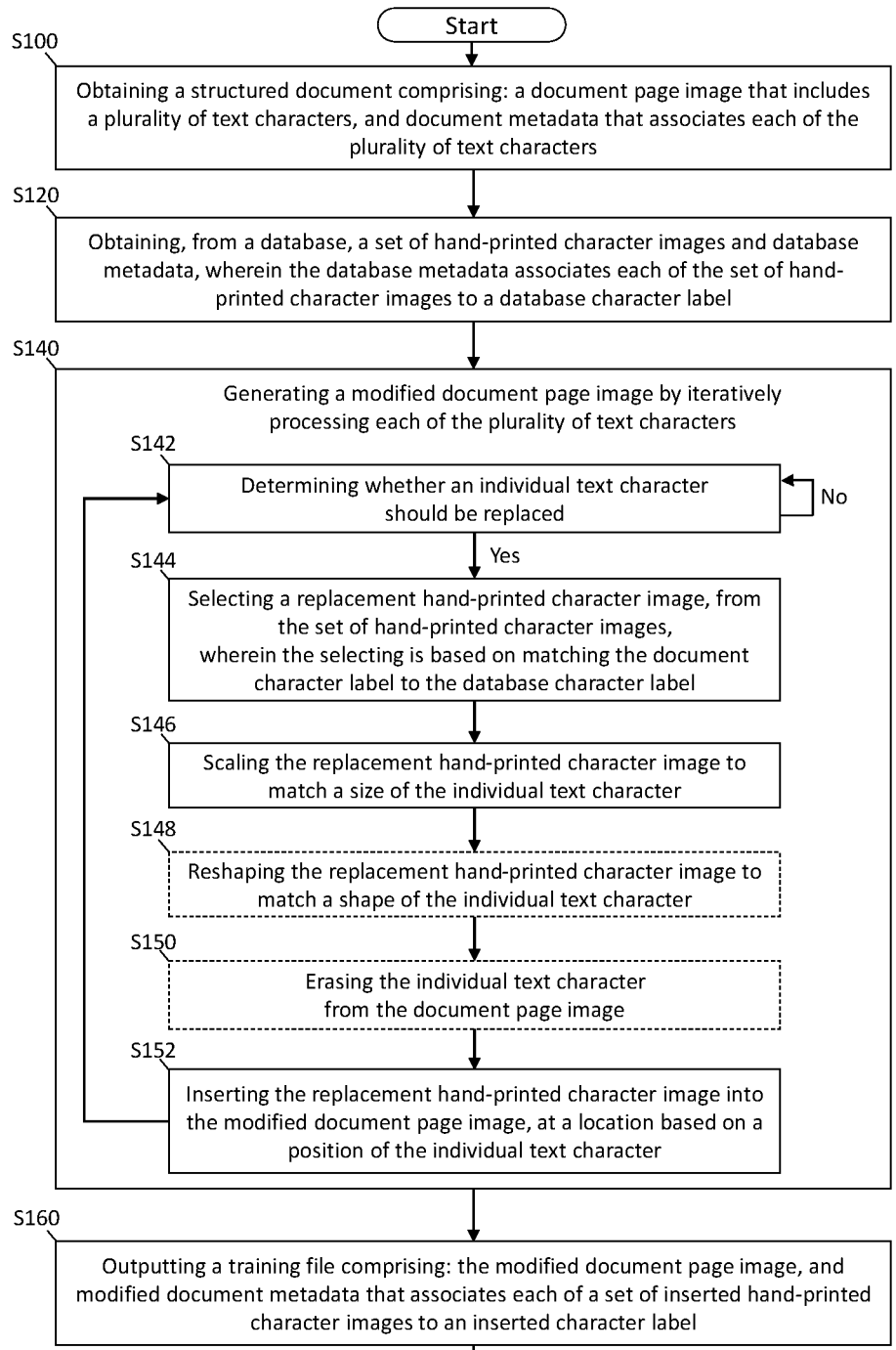
FIG. 1 shows a flowchart of a method for generating training data for hand-printed text recognition, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a method, non-transitory computer readable medium (CRM), and system for generating training data for hand-printed text recognition by processing a document to replace some or all of the typeface characters with hand-printed characters. In one or more embodiments, this is accomplished by overwriting the typeface text characters on each of the document pages with images of hand-printed characters obtained from a database. Each hand-printed character image is selected from the database to replace a particular text character by matching metadata in the document to metadata in the database. The document metadata and the database metadata both include labels that uniquely identify the characters in the document and in the database. In some cases, different groups (e.g., paragraphs) of text characters on a document page may be processed differently. For example, not every group or paragraph may be converted to hand-printed characters. Instead, some groups may be kept as typeface characters in order produce the final result of training data files that include both typeface and hand-printed characters. Also, the database may include subsets of hand-printed characters originating from different writers, and different groups or paragraphs on each document page may be replaced with hand-printed characters from different writers.

FIG. 1 shows a flowchart of a method for generating training data for hand-printed character recognition in accordance with one or more embodiments of the invention. In one or more embodiments, one or more of the steps shown in FIG. 1 may be implemented by a processor and may be combined, omitted, repeated, and/or performed in a different order than the order shown in FIG. 1. Accordingly, the scope of the invention should not be considered limited to the specific arrangement of steps shown in FIG. 1.

In Step S100, a structured document is obtained that comprises a document page image that includes text characters and document metadata that associates each of the text characters to a document character label. The structured document may be an electronic document of any size and in any format including, but not limited to PDF, PostScript, OOXML, ODF, HTML, DOC, DOCX, TXT, RTF, PNG, BMP, JPG, TIFF, etc. The structured document may be part of a collection of structured documents. The structured document may be obtained (e.g., downloaded, scanned, etc.) from any source such as a document repository, memory, website, database, etc.

In one or more embodiments, the structured document comprises at least one document page image and the document metadata. The document page image is a rendered image of a page of a document. The document page image may originate as any image format and may be stored as is or included inside another document container file. The document page image includes text characters, and the text characters may include typeface letters, numerals, syllabograms, logograms, punctuation, mathematical notation, emojis, graphemes, or any glyphs or symbols that are part of a written language. The text characters may be represented in any font, styling, or size. The document metadata associates each of the text characters to a document character label that identifies the character. The document metadata may be stored in any format, and the document character labels may be encoded using any encoding scheme. In one or more embodiments, the document character labels are encoded as Unicode (i.e., following the Unicode Standard).

In one or more embodiments, the document metadata may include additional information about the document and the text characters. The document metadata may include information relating each text character to its size and position in the document. The size and/or position of a text character may be represented as a character bounding box, where the character bounding box is a rectangle that encapsulates the text character. The character bounding box may be specified by the pixels (e.g., x and y locations within the document page image) at two opposing corners of the rectangle. Alternatively, the size and position of a text character may be specified in other ways, such as the height, width, and center pixel of the character, or any other size and positional information. The document metadata may also include information that associates each text character into one or more groups of text characters. Examples of groups of text characters include, but are not limited to, sentences, paragraphs, sections, pages, etc. The association between any one text character and a particular group may be realized by any associating properties. For example, each text character may be explicitly assigned a paragraph within the document metadata. Alternatively, positional outlines or bounding boxes may be defined for each group of text, and each text character is associated with a particular paragraph or group based simply on determining whether the position of the character is located within the boundary of the paragraph or group.

In one or more embodiments, the document metadata may associate each text character with a group of text characters as described above, and the document metadata may further define whether each group is to be converted to hand-printed characters or to remain typeface text.

In Step S120, a set of hand-printed character images is obtained from a database. Database metadata is also obtained from the database, where the database metadata associates each of the set of hand-printed character images to a database character label that identifies the character in the image. The set of hand-printed character images are a group of images that represent or simulate characters as hand-printed by a human. The characters in the database may be any hand-printed letters, numerals, syllabograms, logograms, punctuation, mathematical notation, emojis, graphemes, or any glyphs or symbols that are part of a written language. The database may be any local-memory-based or web-based electronic repository of hand-printed character images. In one or more embodiments, the database may be the NIST Special Database 19, containing hand-printed forms and characters, but any other database of hand-printed characters could also be used.

The database metadata associates each of the hand-printed character images with a hand-printed character label. The hand-printed character labels may be based on any system of encoding the characters of a written language, such that the characters can be uniquely identified. In one or more embodiments, the hand-printed-character labels may be encoded following the Unicode Standard. Regardless of the encoding scheme that is used, the encoding of the document character labels in the document metadata and the hand-printed character labels in the database metadata must be able to be compared to find matches. Therefore, document character labels and the database character labels should either use the same encoding scheme, or a translation or conversion between their encoding schemes must be used so that they may be compared.

In Step S140, a modified document page image is generated by iteratively processing each of the text characters from the document page image. The individual text characters in the document page image are processed iteratively by repeating steps S142-S152 for each text character. The iterative processing of each text character, according to steps S142-S152, ultimately results in the replacement of each typeface text character (in the original document page) by a hand-printed character image (in the final modified document page). In this way, realistic training files (i.e., training documents) that have hand-printed text can be automatically generated from standard typeface-only documents. Because large numbers of typeface documents are readily available and already have each text character labeled (or can be easily labeled automatically), this replacement of typeface characters with hand-printed characters allows for rapid generation of a large number of training files. By contrast, manual generation of hand-printed training documents by humans may take much longer time periods (potentially by several orders of magnitude).

In one or more embodiments, every text character in the document page image is individually processed according to steps S142-S152. In other embodiments, only certain preselected groups or paragraphs of text characters are iteratively processed according to steps S142-S152. The preselection of groups may be based on any preselection criteria. For example, groups may be preselected based on information in the document metadata or alternately selecting every other paragraph in the document page image. In the case where only preselected groups are processed, each of the selected text characters in the preselected groups is processed iteratively according to steps S142-S152.

In Step S142, a determination is made as to whether an individual text character from the document should be replaced with a database character image from the database. This determination is made based on a predetermined condition. The predetermined condition may be any condition related to the document or any other condition. In one or more embodiments, the document metadata may further associate each of the text characters into groups of text characters. In this case, the predefined condition may be based on which of the groups includes the individual text character. For example, the predetermined condition may be based on which group or paragraph includes the individual text character or on the percentage of text characters that have already been replaced with hand-printed character images. In this way, training files that have a mixture of typeface and hand-printed characters can be automatically generated. By incorporating training data that includes documents with both typeface and hand-printed characters, text recognition models may be generated that can accurately recognize text characters in realistic documents that may also include both typeface text and hand-printed characters.

In one or more embodiments, the predetermined condition may be that the text characters in every other paragraph (e.g., only odd-numbered or even-numbered paragraphs) are replaced. In other embodiments, the predetermined condition may be: if at the beginning of each paragraph, fifty percent or more of the text characters preceding the current position on the document page image were not replaced (i.e., remain the original text characters), then each of the text characters in the current paragraph are designated to be replaced with hand-printed character images. In this case, any other percentage could also be chosen for the predetermined condition.

In one or more embodiments, the structured document may be a PDF form that includes areas of pre-entered typeface text and areas intended for a user to enter data in the form of handwriting. Such PDF forms often encode the user-entered data into an XObject of type "/Form." In this case, the labeling of type "/Form" is a part of the document metadata. Thus, the predetermined condition determining which characters are replaced with hand-printed character images may be a test for the "/Form" type. This combination of document metadata and predetermined condition allows for generating training files that imitate realistic forms with appropriately placed handwriting.

Similarly to the discussion above in step S140, step S142 determines which characters will be processed/replaced. In one or more embodiments, this determination may be made based on preselected groups of text characters in aggregate, as discussed in the discussion of step S140. In other embodiments, the determination may be made at the individual text character level, as discussed here, in step S142. In still other embodiments, the determination may be made in a combination of both predefined groups and as part of the iterative processing of each individual text character.

The following steps S144-S152 (selecting, scaling, optional reshaping, optional erasing, and inserting of the hand-printed text character) are performed in response to determining that the individual text character should be replaced. If it is determined that the individual text character should not be replaced, then these steps are not performed, and the iterative process begins again by determining whether the next character should be replaced.

In Step S144, a replacement hand-printed character image is selected from the set of hand-printed character images. This selection is based on matching the document character label, for the individual text character, to the database character label. As discussed above, both the document character label and the database character label may be encoded by any encoding scheme or format. In the case where the database character label and the document character label use different encoding formats, a translation or conversion between the encoding formats may be introduced so that they can be matched. In one or more embodiments, both the database character labels and the document character labels are encoded using the Unicode Standard, allowing for direct comparison and matching.

In one or more embodiments, the database is searched for a hand-printed character image that is associated with a database character label matching the document character label of the individual text character. If one instance of the matching label is found within the database, then the associated hand-printed character image is selected to replace the individual text character. However, in some cases, a matching label may not be found within the database, corresponding to the case where the database is missing a character. When no database character label matches the document character label during the selecting of the replacement hand-printed character image, the selecting is further based on designating a substitute hand-printed character image in accordance with a predefined substitution rule. In one or more embodiments, the substitution rule may comprise the application of a look-up table defining which characters to substitute for any given missing character. In other embodiments the predefined substitution rule may be the substitution of a blank space for any missing character. The predefined substitution rule may also be based on any number of other schemes for substituting a different hand-printed character image in place of a missing image.

In one or more embodiments, the set of hand-printed character images may include a list of two or more hand-printed character images that are each associated with an identical database character label (i.e., the same database character label references multiple hand-printed character images). When the document character label of the individual text character is matched with the identical database character label (i.e., when the individual text character is matched to two or more hand-printed character images from the database), then the selecting is further based on choosing one of the list of two or more hand-printed character images in accordance with a predefined redundant character rule. In one or more embodiments, the predefined redundant character rule comprises successively stepping through the list of two or more hand-printed character images such that for each instance of an individual text character that matches the identical database character label, the next successive list member is selected. In other embodiments, the predefined redundant character rule may stipulate that a member of the list of two or more hand-printed character images is chosen randomly for each instance of an individual text character that matches the identical database character label. For example, if the set of hand-printed character images from the database includes three hand-printed character images representing a lower case "h," each of these would be associated with the same (i.e., identical) database character label. During the iterative processing, when the first individual text character that represents a lower case "h" is processed, the associated document character label would be matched to the database character label associated with all three of the hand-printed character images that represent a lower case "h," resulting in a list of these three hand-printed character images. In one or more embodiments, the predefined redundant character rule may require that the first member of the list is chosen for the first instance of a lower case "h" text character, the second member of the list is chosen for the second text character instance, the third member of the list is chosen for the third text character instance, the first member of the list is chosen again for the fourth text character instance, and so on repeating in this manner. In other embodiments, the predefined redundant character rule may require that for every instance of an individual text character representing a lower case "h," one member of the list is chosen at random. Alternatively, any other rule could be used for how to choose among redundant hand-printed character images. In this way, by allowing different instances of a typeface character to be replaced by similar, but distinct, hand-printed characters, training files can be generated that more accurately represent real-world handwriting (which often has significant variation even among representations of the same character). Accordingly, text-recognition models that are trained on such training files may be more robust and accurate in identifying the characters in real-world, hand-printed text.

In one or more embodiments, the database further includes subsets of the set of hand-printed character images, wherein the subsets are each associated, by the database metadata, to a different writer. In this case, the selecting of the replacement hand-printed character image is further based on excluding, from the selecting, all but one of the subsets, for each of the groups of text characters. In other words, for any grouping (based on paragraphs, information within the document metadata, etc.) of the text characters, one writer may be chosen for each group or paragraph of text characters. In one or more embodiments, as each grouping or paragraph of text characters is processed, a new subset of hand-printed character images (representing a different writer) may be successively used for replacing the text characters within that grouping or paragraph. In this way, by including hand-printed characters from multiple different writers, training files can be generated with a greater variety of hand-printed characters. Accordingly, text-recognition models that are trained on such training files may be more robust and accurate in identifying the characters in real-world, hand-printed text.

In Step S146, the replacement hand-printed character image is scaled to match the size of the individual text character. The replacement hand-printed text character from the database may have a different size than the individual text character in the document page image that it is replacing. As a result, the hand-printed character image may be resized to fit into the space on the document page image that is occupied by the individual text character (i.e., cover as much of the text character as possible without overlapping neighboring text characters). As discussed above, the size of the individual text character may be stored in the document metadata. Similarly, the size of the hand-printed character image may be stored in the database metadata, or alternatively, the dimensions of the hand-printed character image may be measured during the iterative processing of each text character in the document page image. In one or more embodiments, the size information of each text character may be inherently contained in a bounding box of the text character, as discussed above. In this case, the hand-printed character image may be scaled to closely match the size of the bounding box of the text character. This may be achieved by scaling the horizontal dimension of the hand-printed character image to match the horizontal dimension of the bounding box of the text character, while preserving the aspect ratio of the hand-printed character image.

In optional Step S148, the individual text character is optionally erased from the document page image. Erasing the individual text character may involve erasing the entire text character from the document page image, or it may involve only erasing a part of the text character. In one or more embodiments, the shape of the text character may not be identical to the shape of the replacement hand-printed character image. For example, the replacement hand-printed character image and the text character may each be rectangles of differing aspect ratios (i.e., the height divided by the width). If the aspect ratio of the hand-printed character image is smaller than the aspect ratio of the text character on the document page image, then the hand-printed character image may not fully cover the text character when rescaled, if the aspect ratio is preserved. In one or more embodiments, either the whole text character or the uncovered part of the text character may be erased from the document page image by overwriting it with the background color of the document page image.

In optional Step S150, the replacement hand-printed character image is optionally reshaped to match the shape of the individual text character. If as described in the discussion of Step S148, the shape of the replacement hand-printed character image differs from the shape of the individual text character, then the replacement hand-printed character image may be reshaped to closely match the shape of the individual text character. In the example given above where the aspect ratio of the hand-printed character image is smaller than the aspect ratio of the text character in the document page image, the hand-printed character image may be stretched to a taller height in order to match the shape of the text character. In other embodiments, if there is unused, padding space above, below, or to either side of the character in the hand-printed character image, the image may also be reshaped by cropping the image to remove some or all of the unused padding space. In addition, any other stretching, cropping, or reshaping may be performed as necessary depending on the shape of the replacement hand-printed character image relative to the shape of the individual text character.

In Step S152, the replacement hand-printed character image (as scaled and/or reshaped) is inserted into the modified document page image at a location based on the position of the individual text character. As discussed above the position of the text character may be described in the document metadata and may be specified in any way. In one or more embodiments, the location where the replacement hand-printed character image is inserted may be exactly the same as the position of the individual text character. However, in other embodiments, the location may be altered or shifted from the exact position of the individual text character, where the shift may be based on any rule or condition. In this way, by basing the position of the hand-printed character image in the modified document image on the position of the text character in the original document image, the structure of the text is preserved after being transformed to hand-printed characters. The preservation of the structure of the original document allows for the generation of training files where the structural and contextual relationships between text characters are realistic. Therefore, text recognition models trained on such training files may be able to incorporate these relationships between text characters in order to produce robust, accurate, and performant models.

In Step S160, a training file is output comprising the modified document page image and modified document metadata that associates each of a set of inserted hand-printed character images to an inserted character label. In one or more embodiments, a separate training file may be output for every modified document page image, while in other embodiments, one training file may contain multiple modified document page images. The modified document metadata is based on either the original document metadata and/or the database metadata. The modified document metadata associates each inserted hand-printed character image to an inserted character label, where the inserted character labels are based on either the original text character labels or the database character labels, or both. The inserted character labels may be stored using any encoding format including, but not limited to Unicode encoding. Similar to the original document metadata, the modified document metadata may include any other information including groupings (e.g., paragraphs), sizes, shapes, and positions of inserted text characters.

Figure 2A:
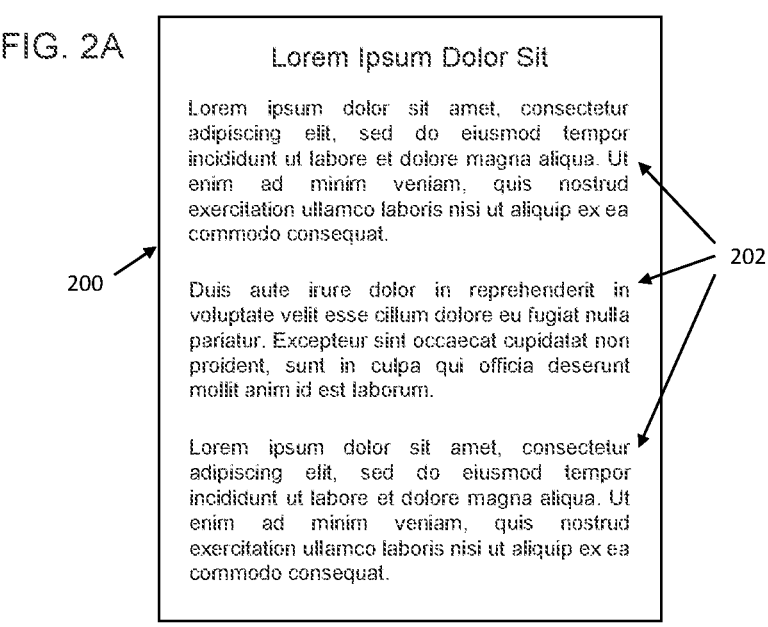
FIG. 2A shows an illustration of a document page image, in accordance with one or more embodiments of the invention.
Figure 2B:
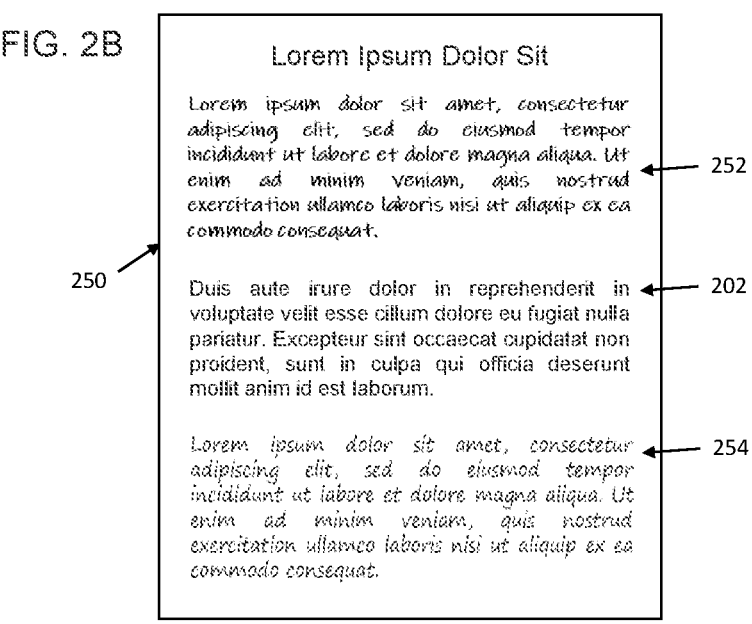
FIG. 2B shows an illustration of a modified document page image, in accordance with one or more embodiments of the invention.

FIGS. 2A and 2B show an illustrative example of how a document page image may be converted from type-face characters to hand-written characters, according to one or more embodiments of the invention. FIG. 2A shows the original document page image 200, including paragraphs 202 that are comprised of type-face text characters. FIG. 2B shows the modified document page image 250 that results from processing the text characters from the original document page image 200, in order to replace the type-face characters with hand-printed characters. In this example, the paragraphs 252 and 254 were converted to hand-printed characters, while paragraph 202 remains unchanged from the original document page image 200. The text characters of paragraphs 252 and 254 were each replaced with hand-printed character images originating from different writers.

FIG. 3 shows a flowchart of an implementation of the invention according to one or more embodiments. At Step S300, the hand-printed character database 301 and the labeled/rendered document 302 are input. The hand-printed character database is the repository for the hand-printed character images that will be used to replace typeface text characters in the rendered document. The rendered document is labeled (i.e., document metadata) to include labels for each of the typeface text characters. At Step S305, the next page of the rendered document is retrieved, and this may be the first page if the processing of the rendered document just began. At Step S310, the paragraphs on the current page are retrieved. Getting the page paragraphs may entail using information from the document metadata that distinguishes the paragraphs or other processing of the page to separate and group the text into paragraphs. At Step S315, the next paragraph is retrieved from the page paragraphs. The next paragraph may be the first paragraph on the page if processing of the page just began. At Step S320, it is determined whether the text characters in the current paragraph are to be converted to hand-printed text (e.g., based on the predetermined condition discussed previously). If the current paragraph is to be converted to hand-printed characters, then Step S325 is performed next, but if not, then Step S360 is performed next so that the paragraph is output as is without converting/replacing any of the text characters. At Step S325, the characters in the database that are associated with the next writer are retrieved (if the database includes hand-printed characters from more than one writer). At Step S330, the next character is retrieved from the current paragraph. The next character may be the first character of the paragraph if the processing of the paragraph just began. At Step S335, the hand-printed character image that corresponds to the current text character of the current paragraph is found within the database. At Step S340, the hand-printed character's bounding box is retrieved, where the bounding box may be the frame of the image or may be a cropped rectangular portion of the image. This bounding box may be included as information in the database metadata or be determined during processing. At Step S345, the hand-printed character image is scaled to closely match the size of the text character in the rendered document. The size of the text character may be included in the document metadata or determined during processing. At Step S350, the scaled hand-printed character image is copied over the target text character bounding box. At Step S355, it is determined if all characters in the current paragraph have been processed. If processing of all characters in the paragraph is complete, then Step S360 is performed. If not, then the steps above are repeated starting at step S330 so as to proceed to the next character in the paragraph. At Step S360, the current paragraph is output. Here, the paragraph may have been preserved as type-face text (as in the case of proceeding directly from Step S320) or the paragraph may have been converted to hand-printed characters (as in the case of proceeding from Step S355). In addition, metadata is output including labels identifying the characters in the paragraph and a type identifying whether the paragraph was converted to hand-printed characters or remains typeface. At Step S365, it is determined whether all paragraphs on the current page have been processed. If all paragraphs have been processed, then Step S370 is performed. If not, then the steps above are repeated starting at Step S315 so as to proceed to the next paragraph on the page. At Step S370, it is determined whether all pages within the document have been processed. If all pages have been processed, then the merge process is complete. If not, then the steps above are repeated starting at Step S305 so as to proceed in processing the next page. In this way, a process of three nested loops is performed for converting the text characters in the document to hand-printed characters, where the first loop iterates over all pages in the document, the second loop iterates over each paragraph on the page, and the third loop iterates over each character within the paragraph.

Figure 4:
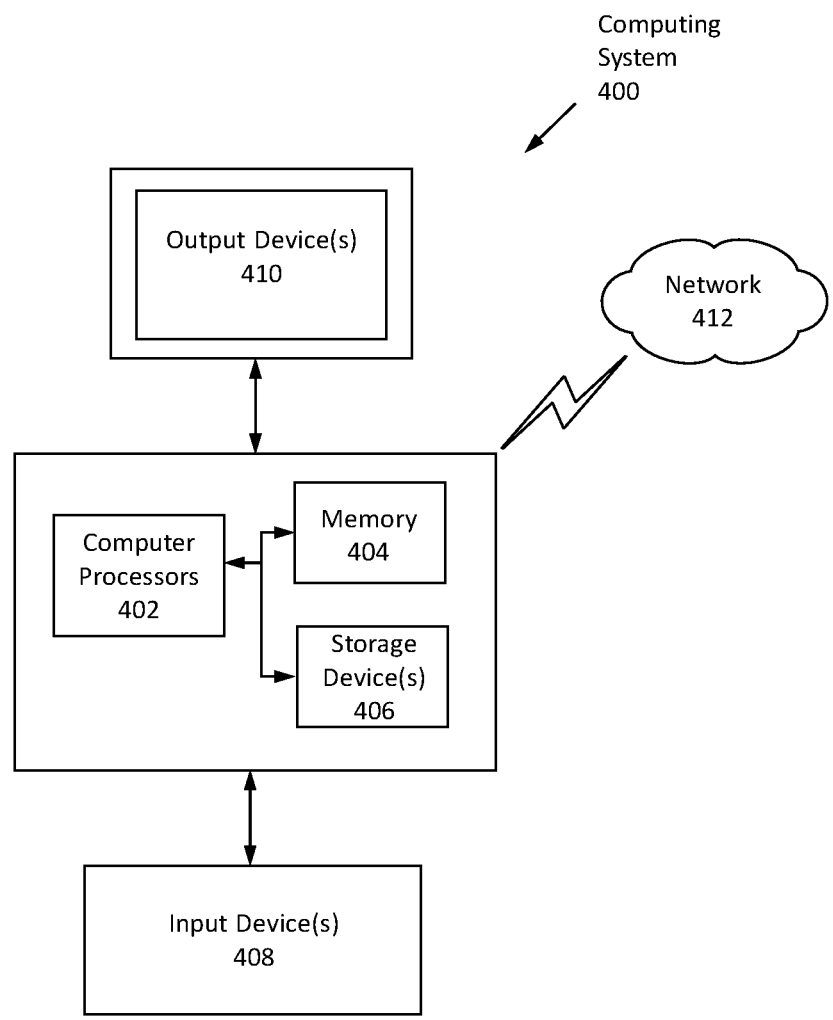
FIG. 4 shows a computing system, in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (408), such as a touchscreen, keyboard, mouse, microphone, touchpad, electronic pen, or any other type of input device. Further, the computing system (400) may include one or more output device(s) (410), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages and improvements over conventional technologies for generating training data for hand-printed text recognition: generating complete, realistic training documents that include typical structural and contextual relationships between different text characters so that these relationships can be incorporated as features in machine learning processes; automatic generation of large numbers of realistic hand-printed training documents in a short period of time; automatically generating hand-printed documents with a mixture of typeface and hand-printed characters where the distribution of typeface characters and hand-printed characters is realistically grouped into separate paragraphs or other groups; and automatically generating training files that include hand-printed characters from multiple different writers. Each of the above listed advantages further has the result of improving the quality and quantity of available training data for hand-printed text recognition models such that the models may be improved by incorporating more and higher quality training data.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for generating training data for hand-printed text recognition, the method comprising:
obtaining a structured document comprising:
a document page image that includes text characters, and
document metadata that associates each of the text characters to a document character label;
obtaining, from a database, a set of hand-printed character images and database metadata, wherein the database metadata associates each of the set of hand-printed character images to a database character label;
generating a modified document page image by iteratively processing each of the text characters, wherein the iterative processing comprises:

determining, based on a predefined condition, whether an individual text character should be replaced;

selecting a replacement hand-printed character image from the set of hand-printed character images, wherein the selecting is based on matching the document character label of the individual text character to the database character label of the replacement hand-printed character image;

scaling the replacement hand-printed character image to match a size of the individual text character in the document page image; and inserting the replacement hand-printed character image into the modified document page image, at a location based on a position of the individual text character, wherein the selecting, scaling, and inserting are each performed in response to determining that the individual text character should be replaced; and outputting a training file comprising:
the modified document page image, and
modified document metadata that associates each of a set of inserted hand-printed character images to an inserted character label.

2. The method of claim 1, wherein
the document metadata further associates each of the text characters into groups of text characters, and
the predefined condition is based on which of the groups includes the individual text character.

3. The method of claim 2, wherein the groups of text characters are paragraphs.

4. The method of claim 2, wherein
the database further includes subsets of the set of hand-printed character images, wherein the subsets are each associated, by the database metadata, to a different writer, and
the selecting of the replacement hand-printed character image is further based on excluding, from the selecting, all but one of the subsets for each of the groups of text characters.

5. The method of claim 1, wherein
the set of hand-printed character images includes a list of two or more hand-printed character images that are each associated with an identical database character label, and
when the document character label of the individual text character is matched with the identical database character label, during the selecting of the replacement hand-printed character image, the selecting is further based on choosing one of the list of two or more hand-printed character images in accordance with a predefined redundant character rule.

6. The method of claim 1, wherein when no database character label matches the document character label during the selecting of the replacement hand-printed character image, the selecting is further based on designating a substitute hand-printed character image in accordance with a predefined substitution rule.

7. The method of claim 1, wherein the iterative processing further comprises:
erasing, in response to determining that the individual text character should be replaced, the individual text character from the document page image.

8. The method of claim 1, wherein the iterative processing further comprises:
reshaping, in response to determining that the individual text character should be replaced, the replacement hand-printed character image to match a shape of the individual text character in the document page image.

9. A non-transitory computer readable medium (CRM) storing computer readable program code for generating training data for hand-printed text recognition, the computer readable program code causes a computer to:
obtain a structured document comprising:
a document page image that includes text characters, and
document metadata that associates each of the text characters to a document character label;
obtain, from a database, a set of hand-printed character images and database metadata, wherein the database metadata associates each of the set of hand-printed character images to a database character label;
generate a modified document page image by iteratively processing each of the text characters, wherein the iterative processing comprises:
determining, based on a predefined condition, whether an individual text character should be replaced;
selecting a replacement hand-printed character image from the set of hand-printed character images, wherein the selecting is based on matching the document character label of the individual text character to the database character label of the replacement hand-printed character image;
scaling the replacement hand-printed character image to match a size of the individual text character in the document page image; and
inserting the replacement hand-printed character image into the modified document page image, at a location based on a position of the individual text character, wherein
the selecting, scaling, and inserting are each performed in response to determining that the individual text character should be replaced; and
output a training file comprising:
the modified document page image, and
modified document metadata that associates each of a set of inserted hand-printed character images to an inserted character label.

10. The non-transitory CRM of claim 9, wherein
the document metadata further associates each of the text characters into groups of text characters, and
the predefined condition is based on which of the groups includes the individual text character.

11. The non-transitory CRM of claim 10, wherein the groups of text characters are paragraphs.

12. The non-transitory CRM of claim 10, wherein
the database further includes subsets of the set of hand-printed character images, wherein the subsets are each associated, by the database metadata, to a different writer, and
the selecting of the replacement hand-printed character image is further based on excluding, from the selecting, all but one of the subsets for each of the groups of text characters.

13. The non-transitory CRM of claim 9, wherein
the set of hand-printed character images includes a list of two or more hand-printed character images that are each associated with an identical database character label, and
when the document character label of the individual text character is matched with the identical database character label, during the selecting of the replacement hand- printed character image, the selecting is further based on choosing one of the list of two or more hand-printed character images in accordance with a predefined redundant character rule.

14. The non-transitory CRM of claim 9, wherein when no database character label matches the document character label during the selecting of the replacement hand-printed character image, the selecting is further based on designating a substitute hand-printed character image in accordance with a predefined substitution rule.

15. A system for generating training data for hand-printed text recognition, the system comprising:
a memory;
a processor coupled to the memory, wherein the processor:
obtains a structured document comprising:
a document page image that includes text characters, and
document metadata that associates each of the text characters to a document character label;
obtains, from a database, a set of hand-printed character images and database metadata, wherein the database metadata associates each of the set of hand-printed character images to a database character label;
generates a modified document page image by iteratively processing each of the text characters, wherein the iterative processing comprises:
determining, based on a predefined condition, whether an individual text character should be replaced;
selecting a replacement hand-printed character image from the set of hand-printed character images, wherein the selecting is based on matching the document character label of the individual text character to the database character label of the replacement hand-printed character image;
scaling the replacement hand-printed character image to match a size of the individual text character in the document page image; and
inserting the replacement hand-printed character image into the modified document page image, at a location based on a position of the individual text character, wherein
the selecting, scaling, and inserting are each performed in response to determining that the individual text character should be replaced; and
outputs a training file comprising:
the modified document page image, and
modified document metadata that associates each of a set of inserted hand-printed character images to an inserted character label.

16. The system of claim 15, wherein
the document metadata further associates each of the text characters into groups of text characters, and
the predefined condition is based on which of the groups includes the individual text character.

17. The system of claim 16, wherein the groups of text characters are paragraphs.

18. The system of claim 16, wherein
the database further includes subsets of the set of hand-printed character images, wherein the subsets are each associated, by the database metadata, to a different writer, and
the selecting of the replacement hand-printed character image is further based on excluding, from the selecting, all but one of the subsets for each of the groups of text characters.

19. The system of claim 15, wherein
the set of hand-printed character images includes a list of two or more hand-printed character images that are each associated with an identical database character label, and
when the document character label of the individual text character is matched with the identical database character label, during the selecting of the replacement hand-printed character image, the selecting is further based on choosing one of the list of two or more hand-printed character images in accordance with a predefined redundant character rule.

20. The system of claim 15, wherein when no database character label matches the document character label during the selecting of the replacement hand-printed character image, the selecting is further based on designating a substitute hand-printed character image in accordance with a predefined substitution rule.

* * * * *